April 14, 1964  S. J. RHODES ETAL  3,128,718
HIGH PRESSURE PUMP
Filed May 8, 1961

INVENTORS
STANLEY J. RHODES
ARTHUR F. ZEMAN
BY
Chester W. Brown
ATTORNEY

United States Patent Office 3,128,718
Patented Apr. 14, 1964

3,128,718
HIGH PRESSURE PUMP
Stanley J. Rhodes, 2702 S. 46th St., Milwaukee, Wis., and Arthur F. Zeman, 8622 Stickney Ave., Wauwatosa, Wis.
Filed May 8, 1961, Ser. No. 108,573
2 Claims. (Cl. 103—153)

This invention relates to an improvement in a piston for a high pressure pump, more particularly of the type disclosed in application Serial No. 760,184, for "Hydraulic Pump Mechanism," filed September 10, 1958, now abandoned, by Stanley J. Rhodes, one of the co-inventors in the present application.

One of the more serious problems in high pressure pumps, particularly those in which pistons having a relatively small transverse cross-sectional area and which reciprocate at relatively high speeds, is in reducing leakage of fluid between the piston and wall of the cylinder.

Applicants are aware of the fact that it is standard practice to provide piston rings which perform their function well in the type of pumps and engines in which they are used, but it has been impractical and inefficient to provide piston rings in high speed-high pressure pumps which embody pistons of a fraction part of an inch in diameter.

The principal object of this invention is to provide a novel arrangement wherein a piston embodies an expansible portion which responds to pressure in the cylinder and minimizes the normal tolerance between the piston and cylinder bore, thereby substantially preventing fluid from passing outwardly of the cylinder between the piston and wall of the cylinder.

More specifically, it is an object to provide in a high speed-high pressure pump, a piston having at one end a tapered recess flared inwardly of the cylinder toward the discharge end thereof.

Another object is to provide a piston having an axial bore comprising three successive bore sections one of which serves as an inlet port, a second of which is of greater diameter than the inlet port and serves as a valve chamber, and a third of which flares outward and serves as a discharge port in combination with a ball-valve in the valve chamber and biasing means in the valve chamber normally biasing the ball-valve to close the inlet port.

Further objects will be apparent from the following specification, appended claims and drawings thereof in which FIG. 1 is a fragmentary view partly in section illustrating a cam operated pumping device.

Figure 1:
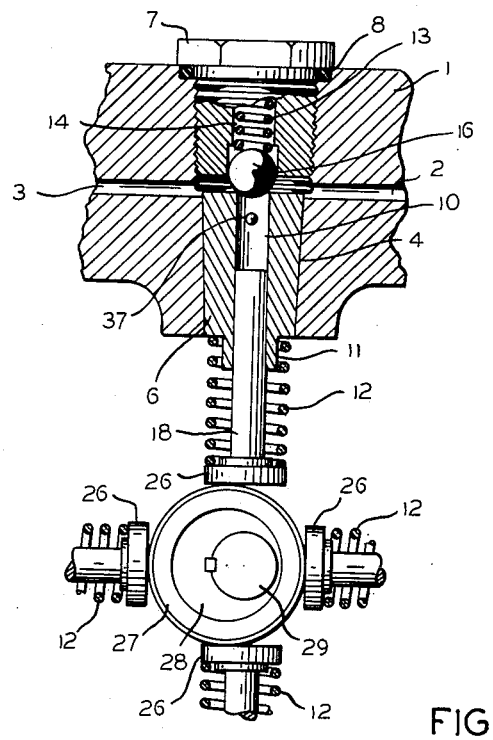

The pumping mechanism is illustrated in greater detail in the application of the co-inventor in the present case, Stanley J. Rhodes, S.N. 760,184, filed September 10, 1958, for Hydraulic Pump Mechanism.

Like parts are identified by the same reference numerals throughout the various views.

The pump includes a block 1 having outlet conduits 2 and 3 in axial alignment and a bore transversely thereof comprising a tapered portion 4 on one side of the conduits and a threaded portion 5 on the opposite side. Seated within the portion 4 is a cylinder 6 having its outer periphery tapered complementary to the taper of portion 4. A closure member 7 is threaded into the portion 5 and engages an O-ring seal 8 seated in the annular area 9 to seal the pump against leakage.

The cylinder 6 has a bore 10 axially and an extension 11 serving as an extension and a guide for one end of the compressing coil spring 12. The closure member 7 is provided with cavity 13 which receives the compression coil spring 14, the cavity being enlarged at 15 to permit a limited free movement of the check ball 16 normally biased to close the cylinder bore 10 adjacent the conduit end thereof.

As indicated the closure member 7 and cylinder bore 10 are spaced from each other to provide a conduit area 17 on opposite sides of the ball 16 and communicating with outlet conduits 2 and 3. A piston 18 is reciprocally mounted in the cylinder bore 10 and is provided with an axial bore comprising successively an inlet portion 19, a valve chamber 20 and an outlet portion or recess 21 which flares outwardly from the chamber 20 toward the discharge end of the cylinder bore 10.

The inlet portion 19 is provided with diametrically opposite ports 22 radially of the axis of the piston to facilitate entry of fluid through the inlet portion 19. Disposed in the chamber 20, is a ball check valve 23 normally biased by coil spring 24 to close the inlet portion 19. A tube 25, substantially co-axial with bore in piston 18 is suitably secured in the chamber 20, as by push fit, and holds the coil spring 24 compressed against the ball valve 23. The end 26 of the piston 18 serves as a bearing surface contacting with the camming ring 27 on the cam 28 carried by the power shaft 29.

FIG. 1 suggests a pump in which four pistons are provided, three of which are shown fragmentarily and may be assumed to be identical to arrangement of the other shown in more detail and which illustrates the novel invention herein disclosed.

Assuming that the cam 28 is rotated in a clockwise direction relative to FIG. 1 the piston 18 will be moved inwardly of the cylinder bore 10 toward the ball valve 16 and against the bias of spring 12. Obviously fluid disposed between the ball valves 12 and 23 will cause the ball valve 12 to move against the bias of coil spring 14 and permit the fluid to pass from the cylinder bore 10 and into the conduits 2 and 3 through the conduit area 17. Although it has not been illustrated in the drawings, it will be understood that each of the pumps discharge into a conduit 2—3 connecting each and that the flow of fluid in the conduit 2—3 will be in the same direction from the pumps to a common outlet, not shown, such as disclosed in the aforesaid copending application S.N. 760,184.

When the piston has reached its extreme position of movement as aforesaid, the ball valve 16 will reseat under the bias of spring 14 and thus prevent fluid in conduit 2—3 from reentering the cylinder bore 10 when the piston moves in the opposite direction. Continued rotation of the cam 28 after the piston has reached its extreme position, as afore-indicated, will then permit the piston 18 to move outwardly of the cylinder bore 10 under the bias of spring 12. When the piston thus moves outwardly, fluid will pass into the cylinder bore 10 through the inlet ports 19—22, past the ball valve 23 and through the tube 25 and outlet portion or recess 21. When the piston 18 reaches its extreme outward movement, the ball valve 23 will close the inlet port 19 under the bias of spring 24 and thus prevent fluid between valves 16 and 23 from returning through port 19.

As previously indicated, the outlet portion or recess 21 in the piston 18 flares outwardly toward the discharge ball valve 16. This provides a wall 30 of decreasing thickness that response resiliently to the high pressure of the fluid in the cylinder bore 10 and thus increases the outer diameter of the piston to more closely approach the inner diameter of the bore 10 and prevent fluid leakage between the piston 18 and wall of the bore 10.

It will be obvious from the foregoing that modifications may be made without departing from the spirit of the invention herein disclosed, the primary improvement herein disclosed, residing in a piston having a conoidal recess at its high pressure end flaring outwardly toward the discharge end of the cylinder, thereby providing a wall of decreasing thickness responsive to high pressure in the cylinder and preventing leakage between the piston and wall of the cylinder. One such modification is illustrated in FIG. 3.

Figure 3:
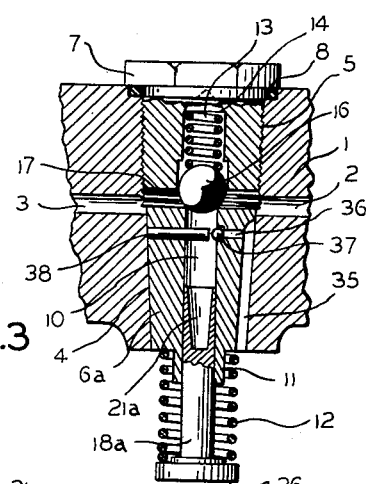
FIG. 3 is a fragmentary sectional view illustrating an embodiment of the invention herein disclosed, the view being on a reduced scale.
Figure 2:
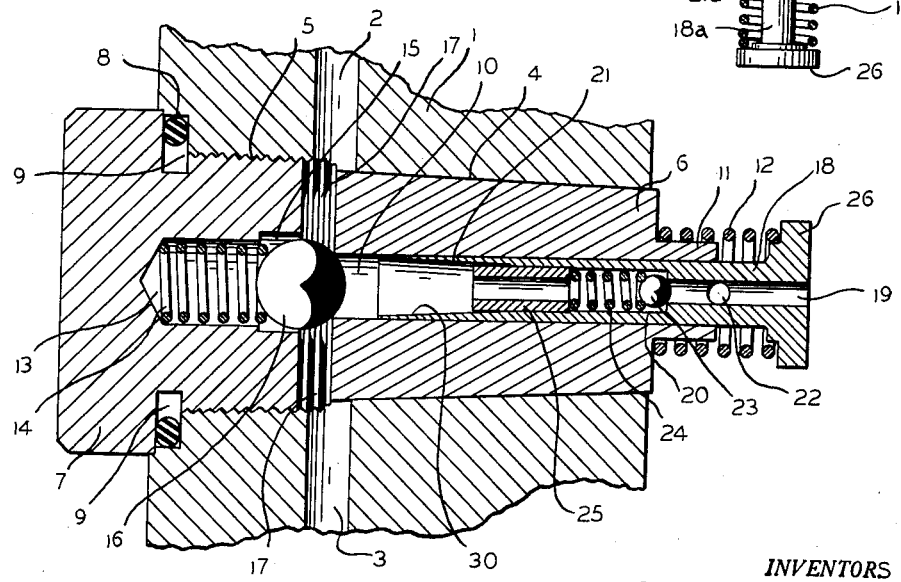
FIG. 2 is an enlarged fragmentary view illustrating in sectional detail a modified form of the pump cylinder and piston shown in FIG. 1.

In FIG. 3, the cylinder 6a is tapered as in FIG. 2 to conform to the tapered bore 4 in the block 1. However, the cylinder 6a is provided with an inlet slot 35 in the outer periphery of the cylinder and extending longitudinally thereof. The slot communicates with the inlet port 36 which is enlarged adjacent the cylinder bore 10 to receive a check ball-valve 37. Diametrically opposite the port 36 is a pin 38 extending through the wall of the cylinder 6a to a point sufficiently close to the inlet port 36 to prevent the ball-valve 37 from dropping out of its operative position in the port 36.

The piston 18a in the FIG. 3 modification differs from that in FIG. 2 in that it does not have an inlet port or check ball-valve. However, the high pressure end of the piston 18a is provided with an inwardly tapered frusto-conical recess 21a which provides a wall of decreasing thickness toward the high pressure end of the piston. This wall 30a of decreasing thickness, as in the FIG. 2 disclosure, responds resiliently to high pressure in the cylinder bore 10 and reduces leakage of fluid between the cylinder wall and the piston.

In operation, when the piston 18a is receding, fluid will enter the cylinder bore 10 through the slot 35 and port 36 and past the ball check valve 37. When the piston moves toward the check ball 16, the ball 37 will close the inlet port 36 and fluid in the cylinder bore 10 will be forced past the outlet valve 37 and into the conduit 2—3 in the block 1.

It will be apparent from the foregoing that various modifications may be adopted without departing from the spirit of our invention and therefore, it will be understood that the following claims are intended to be of sufficient scope to embody all modifications unless the terms thereof are obviously specific in the recital of combinations.

We claim as our invention:

1. In a high speed-high pressure hydraulic pump including a cylinder and inlet and outlet valving means; an elongated piston reciprocable in said cylinder and having an axially recessed head end, said recess defined by a relatively thin annular wall, the inner periphery of the wall flaring outwardly toward the head end of said cylinder, the diameter of the piston and outer periphery of said wall closely approximating the inner diameter of said cylinder, and the annular thickness of said wall decreasing toward said head end of said cylinder, whereby the expansible resiliency of said wall increases toward said head end of said cylinder and is increasingly responsive to high pressure in said cylinder in proportion to decreasing thickness of said wall.

2. In a high speed-high pressure hydraulic pump including a cylinder having outlet means, piston biasing spring and a piston operating cam; an elongated tubular piston reciprocable in said cylinder, one end projecting outwardly from said cylinder and having a radially disposed annular flange providing a cam bearing surface on one side and a spring engaging face on the opposite side, the interior of said tubular piston an inlet portion extending from said one end, a valve chamber intermediate the ends of said piston of larger diameter than said inlet portion providing a valve seat between said inlet portion and valve chamber, and an outlet portion extending from said valve chamber to the opposite end of said piston, said outlet portion defined by a relatively thin wall flaring outwardly from said valve chamber toward said opposite end of said piston, a ball check valve in said chamber biased toward said valve seat, a coil spring in said chamber biasing said ball valve, and a tube secured in said chamber and holding said spring in biasing relation to said valve, the wall defining said outlet portion being relatively thin decreasing thickness and increasingly-resiliently responsive to fluid pressure toward the opposite end of said piston.

References Cited in the file of this patent

UNITED STATES PATENTS

| | | |
|---|---|---|
| 2,060,846 | Bowen | Nov. 17, 1936 |
| 2,956,509 | Cooprider | Oct. 18, 1960 |
| 2,966,861 | Stewart et al. | Jan. 3, 1961 |
| 2,987,006 | Bowers et al. | June 6, 1961 |
| 3,002,528 | Leissner | Oct. 3, 1961 |
| 3,016,717 | Gottzmann | Jan. 16, 1962 |
| 3,044,413 | Corsette | July 17, 1962 |
| 3,062,416 | Cooprider | Nov. 6, 1962 |